Dec. 22, 1936.                D. BYRD                2,065,425
                         MECHANICAL BALLOT
              Filed April 15, 1935         2 Sheets-Sheet 1
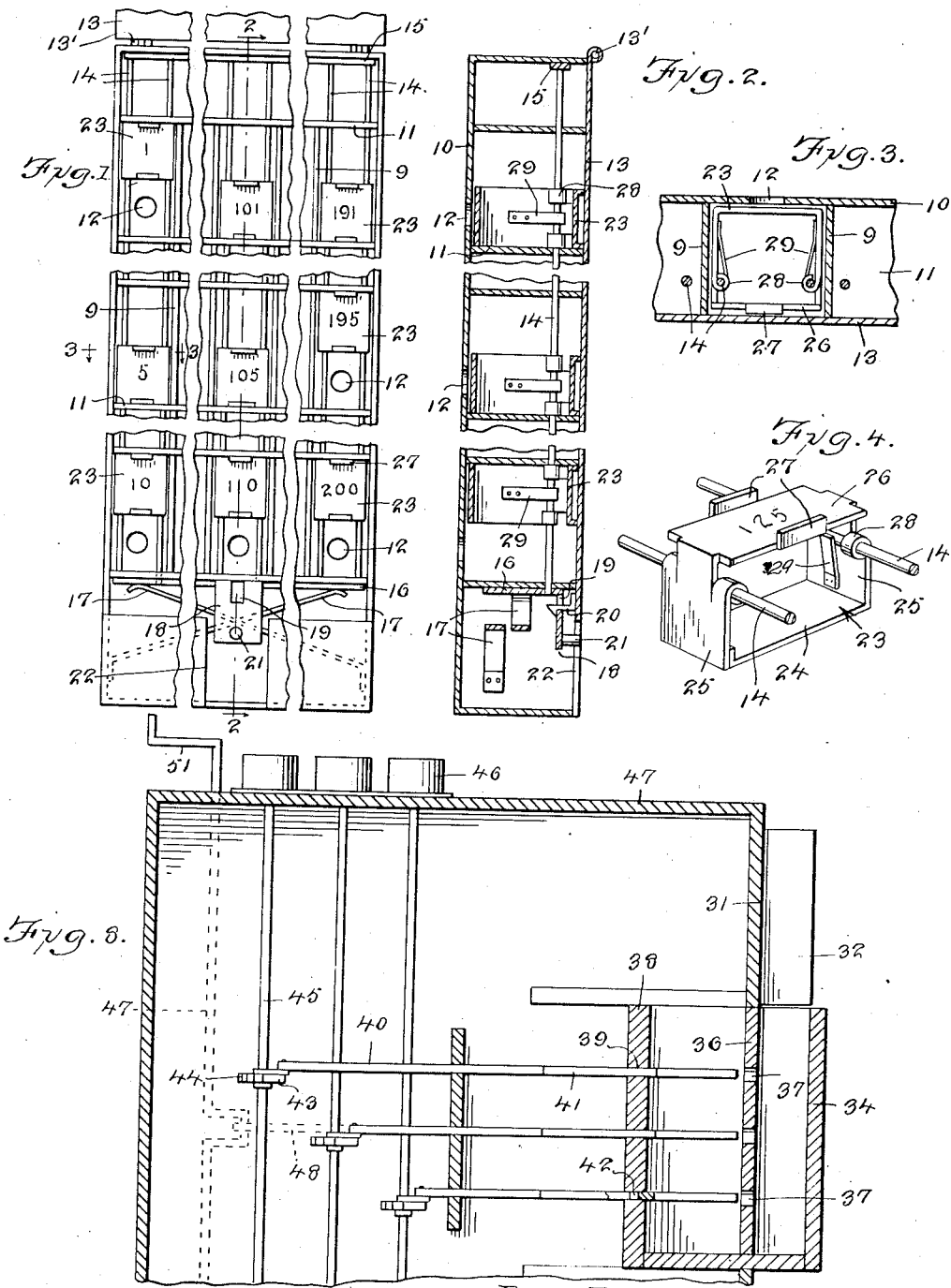
INVENTOR
Don Byrd
BY Victor J. Evans & Co.
ATTORNEY Dec. 22, 1936.  D. BYRD  2,065,425
MECHANICAL BALLOT
Filed April 15, 1935   2 Sheets-Sheet 2

Don Byrd
INVENTOR
BY Victor J. Evans & Co.
ATTORNEY

Patented Dec. 22, 1936

2,065,425

UNITED STATES PATENT OFFICE 2,065,425

MECHANICAL BALLOT

Don Byrd, Franklin, W. Va.

Application April 15, 1935, Serial No. 16,469

4 Claims. (Cl. 235—51)

This invention relates to voting machines and has for an object to provide voting apparatus having a plurality of movable members adapted to be manually set in a pattern by the voter to indicate candidates voted for.

A further object is to provide apparatus in which said pattern will be sealed against detection so that the voters' choice will be maintained secret.

A further object is to provide apparatus whereby counting mechanism will be operated by selected members in said pattern to record the vote for the various candidates selected by the voter and indicated by the pattern.

A further object is to provide apparatus including means for resetting the members to destroy the pattern after each actuation of the counting means so that the same apparatus may be used by the succeeding voter without divulging the preceding voter's choice of candidates.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a front elevation of the mechanical ballot or assembly of slides manipulated by the voter and representing candidates.

Figure 2 is a vertical sectional view taken on the line 2—2 of Figure 1.

Figure 3 is a cross sectional view taken on the line 3—3 of Figure 1.

Figure 4 is a detail perspective view of one of the slides.

Figure 5:
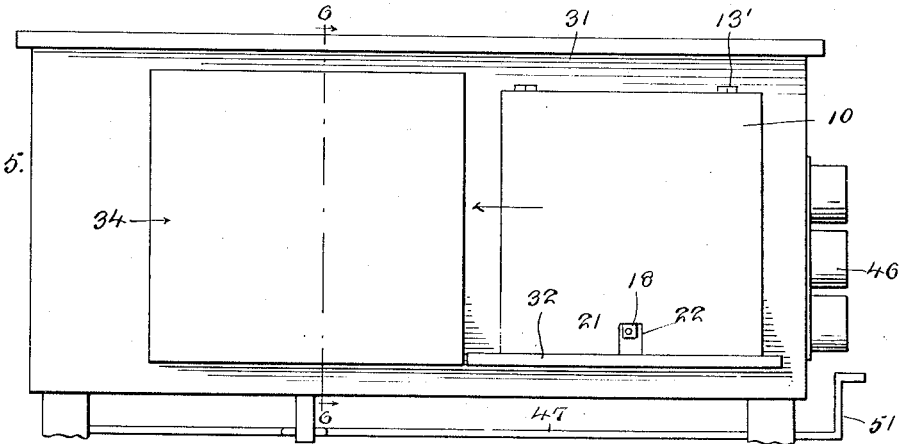

Figure 5 is a front elevation of the counting apparatus.

Figure 6:
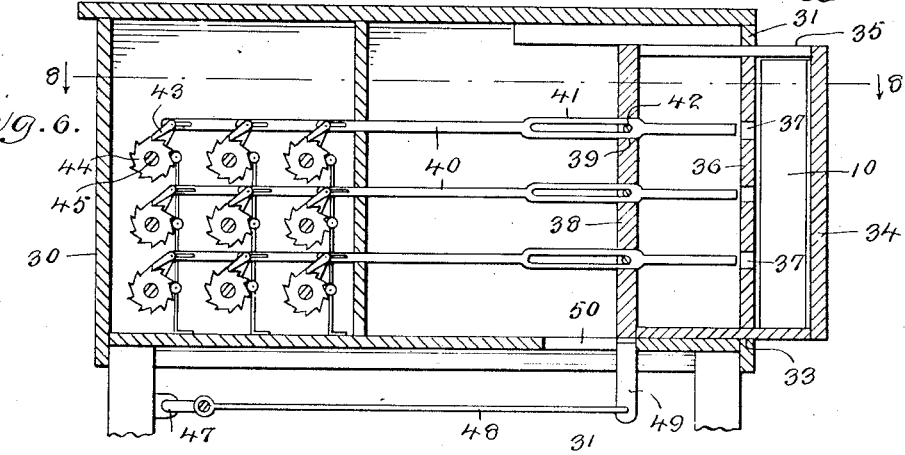

Figure 6 is a cross sectional view taken on the line 6—6 of Figure 5.

Figure 7:
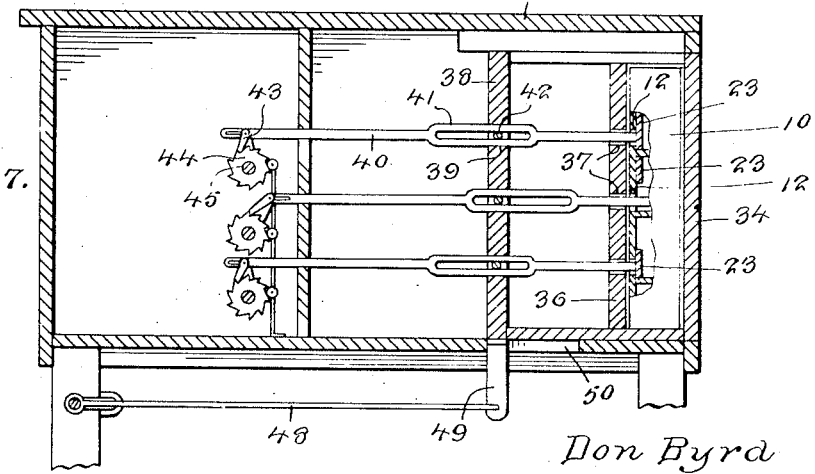

Figure 7 is a view similar to Figure 6 but showing the carrier moved to actuate the plungers which operate the counter wheels.

Figure 8 is a cross sectional view taken on the line 8—8 of Figure 6.

Referring now to the drawings in which like characters of reference designate similar parts in the various views, 10 designates a casing which preferably is formed of sheet metal and is provided with a plurality of division walls 11 and 9 which form compartments in the casing, the back wall of the casing being provided with openings 12 disposed adjacent to one of the division walls of each compartment as best shown in Figure 2. A door 13 closes the front of the casing and is hinged at one end to the casing as shown at 13'.

A plurality of parallel rods 14 are slidably fitted in openings formed in the division walls 11 and are connected together at the top by a cross bar 15. The rods are connected together at the bottom by a plate 16. Leaf springs 17 are secured to the side walls of the casing and bear with their free ends against the plate 16 to hold the plate against the lowermost division wall 11 so that the rods 14 are normally held at one limit of sliding movement through the division walls in the casing. A keeper 18 projects at an angle from the plate 16 and is provided with a slot 19 to receive a spring hook or catch 20 carried by the inside of the door. A handle 21 extends from the keeper through a slot 22 formed in the door below the catch. To open the door the voter pulls the handle 21 lengthwise of the slot which frees the catch 20 and at the same time pulls the rods 14 longitudinally in the casing against the tension of the springs 17 for a purpose which will be fully explained hereafter.

Within each compartment a slide 23 is arranged and each slide corresponds to a candidate, and preferably the casing is arranged of such dimensions as to receive approximately two hundred of these slides. Each slide is preferably formed of sheet metal and is in the nature of a rectangular box open at the ends. The slide is provided with a back wall 24, side walls 25, and a front wall 26 which latter is provided with projections 27 which form handles to manipulate the slide. Eyes 28 are formed on each side wall and these loosely receive the pair of rods 14 which extend through the compartment. The slide may be moved on the rods longitudinally of the compartment after the door 13 is opened to permit the back wall 24 to seal the opening 12 in the compartment as shown in Figure 2. The front wall 26 of the slide is provided with a numeral which designates a particular candidate to be voted for. Thus the voter may vote for candidates numbers 101, 191, 5 and 105 by moving the slides bearing these numbers to seal the plunger receiving openings 12 as will later be fully explained.

In order that the pattern in which the slides are arranged by any voter will be maintained in secrecy the pattern is destroyed after the vote has been counted and before the door 13 can again be opened and this is accomplished as follows.

The slides are equipped with spring fingers 29 which bear frictionally with their free ends against the rods 14 as shown in Figure 3. Consequently when the handle 21 of the keeper 18 is pulled out in the slot 22 to open the door the rods 14 will be pulled in the same direction and move through the slides arranged in a pattern by the voter, that is numbers 101, 191, 5 and 105 and simultaneously therewith the rods will carry the other slides along with them to register with the openings 12. When the handle is released the springs 17 push the rods back to initial position and then carry all of the slides back against the partitions 11 to unseal the openings 12. Thus the pattern made by the preceding voter can never be disclosed to a succeeding voter who may thereafter use the casing to record his vote, for when the door is unlocked as above described by pulling out the handle 21 in the slot 22, said succeeding voter only sees all of the slides in neutral position out of registration with the openings 12. The door being now open the voter may manipulate the slides to form a pattern in which selected slides, corresponding to his candidates, seal the openings 12.

For counting the vote, counting apparatus is provided comprising a casing 30 having a front wall 31 which is provided with a shelf 32 to receive the casing 10. The front wall is provided with an opening 33 which slidably receives a carrier 34 which may be in the nature of a skeleton drawer having an opening 35 in one side through which the casing 10 is transferred from the shelf 32. A division wall 36 in the carrier is provided with openings 37 which register with the openings 12 in the rear wall of the casing 10 as best shown in Figure 7. The rear wall 38 of the carrier is provided with openings 39 which slidably receive plungers 40, each plunger being provided intermediate the ends with a guide eye 41 which fits in the corresponding opening 39 and a pin 42 in the opening projects through the eye to limit movement of the plunger in either direction. Each plunger is equipped with a pawl 43 which engages a ratchet wheel 44 that is connected to a shaft 45, best shown in Figure 8, which latter operates a counting device 46 of any preferred type arranged on the side wall 47 of the casing as also shown best in Figure 8.

It will be observed by referring to Figure 7 that when the carrier 34 is moved inwardly into the counting machine casing the casing 10 will be correspondingly moved and those slides which are registering with the openings 12 will strike the corresponding plungers and move the plungers to impart step actuation to the ratchet wheels 44. The plungers not encountering a slide 23 will of course move through the aligned openings 37 in the carrier 34 and openings 12 in the casing 10 without disturbing the corresponding ratchet wheel 44. The carrier 34 is opened and closed in any preferred manner and for the purpose of illustration in the present embodiment to accomplish this purpose a crank shaft 47 is connected by means of a link 48 to a lug 49 projecting from the carrier and extending through a slot 50 in the casing 31, contact of the lug 49 with the ends of the slot limiting movement of the carrier in either direction.

In operation, the mechanical ballot or casing 10 is taken into the booth by the voter to cast his vote. In the booth or at some other convenient locality will be a list of the candidates with their designating numbers. The voter casts his vote by first opening the door 13 which necessitates pulling the handle 21 longitudinally in the slot 22 and thereby pulling the rods 14 downwardly against the tension of the springs 17. Immediately the handle is released, the springs 17 return the rods to initial position carrying all of the slides to the division walls or stop walls 11 away from the openings 12. The door being open, the voter now selects the numbered slides corresponding to the candidates he wishes to vote for and moves them longitudinally of the rods 14 to seal the associated openings 12 in the casing. Thereupon he closes the door 13 which automatically locks shut by the catch 20 springing over the keeper 18. The voter now delivers the casing to the election commissioner who deposits it immediately in the counting machine in the presence of the voter by placing it upon the shelf 32 and sliding it into the open carrier 34.

The commissioner or some other authorized person then turns the crank handle 51 on the crank shaft 47 to move the carrier 34 and cause those slides which are sealing the openings 12 to impinge against the associated plungers 40 and move the corresponding ratchet wheels 44 to actuate the counting device 46. The crank handle is then turned in a reversed direction to move the carrier and plungers back to initial position. The election commissioner now removes the casing 10 from the carrier and passes it to the registration clerk or some other authorized person to be given to the next voter who retires to the booth, but before he can vote he must unlatch the cover 13 and by so doing he resets all of the changes of the pattern made by the previous voter. Thereupon he proceeds to set the slides corresponding to the candidates he desires to vote for as previously described.

The present embodiment of the invention shows a voting machine with a capacity of two hundred candidates but for the purpose of an example only nine of the slides corresponding to nine candidates are shown and described. The counting machine 31 will have the same capacity as the casing 10.

It will now be seen that I have provided not only a voting machine but also a counting machine for counting the votes cast, and that the apparatus is simple in construction, inexpensive to manufacture, simple to operate, dependable, and small enough to permit easy handling and transportation from place to place.

From the above description it is thought that the construction and operation of my invention will be fully understood without further explanation.

What is claimed is:

1. Voting apparatus comprising a casing having plunger receiving openings, stops in the casing adjacent to the openings, rods slidably mounted in the casing, spring pressed slides on the rods representing candidates, a door for the casing, a spring catch for locking the door, and a keeper for the catch connected to the rods to move all of the rods during unlocking of the door and dispose the slides against the stops to obstruct the openings, said slides being adapted to be manually moved selectively on the rods to seal said openings.

2. Voting apparatus comprising a casing provided in the back wall with plunger receiving openings, a hinged door closing the front of the casing, division walls forming compartments in the casing, parallel rods connected together at the top and at the bottom and slidably projecting through the walls, slides representing candidates disposed on the rods in the compartments, leaf springs on the slides frictionally engaging the rods, a spring catch on the inside of the door, a keeper for the catch connected to the rods and having a handle projecting through an opening in the door, manual movement of the keeper away from the catch moving the rods to dispose all of the slides in register with said openings, and springs for moving the rods to reset all the slides in neutral position away from said openings, said slides being manually movable selectively on the rods to seal said openings.

3. Voting apparatus comprising a casing formed with a plurality of openings for the entrance of counter actuating plungers, manually movable slides disposed within the casing and respectively identifying candidates, the slides being adjustable to positions in obstructing relation to said openings, means for resetting said slides to positions in unobstructing relation to said openings, a door for the casing, and operative connections between said means and door to necessitate actuation of the former for the release of the latter.

4. Voting apparatus comprising a casing provided with plunger receiving openings, a door on the casing, locking means for the door, slides mounted within the casing and selectively adjustable to positions in obstructing relation to said openings, and means actuated by unlocking the locking means to position all of the slides in obstructing relation to said openings.

DON BYRD.